United States Patent
Fu et al.

(10) Patent No.: US 10,057,077 B2
(45) Date of Patent: Aug. 21, 2018

(54) METHOD AND SERVER FOR CONTROLLING SMART DEVICES BASED ON PREDEFINED SCENARIO MODE

(71) Applicant: Xiaomi Inc., Beijing (CN)

(72) Inventors: Qiang Fu, Beijing (CN); Ziguang Gao, Beijing (CN); Yang Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 482 days.

(21) Appl. No.: 14/791,235

(22) Filed: Jul. 2, 2015

(65) Prior Publication Data
US 2016/0127145 A1    May 5, 2016

Related U.S. Application Data

(63) Continuation of application No. PCT/CN2015/074587, filed on Mar. 19, 2015.

(30) Foreign Application Priority Data

Oct. 29, 2014    (CN) .......................... 2014 1 0594507

(51) Int. Cl.
*G05B 13/00*    (2006.01)
*G05B 15/00*    (2006.01)
(Continued)

(52) U.S. Cl.
CPC ........ *H04L 12/2816* (2013.01); *G05B 19/042* (2013.01); *H04L 12/282* (2013.01);
(Continued)

(58) Field of Classification Search
CPC .. H04W 4/008; H04W 4/005; H04L 12/2803; H04L 12/2809; H04L 12/2814; H04L 12/2816
(Continued)

(56) References Cited

U.S. PATENT DOCUMENTS

2008/0263600 A1* 10/2008 Olague .................... H04N 5/44
                                                            725/58
2013/0226316 A1    8/2013 Duchene et al.
(Continued)

FOREIGN PATENT DOCUMENTS

CN    101197744 A    6/2008
CN    101309297 A    11/2008
(Continued)

OTHER PUBLICATIONS

"International Search Report for PCT/CN2015/074587".
(Continued)

*Primary Examiner* — Michael J Brown
(74) *Attorney, Agent, or Firm* — Jun He Law Offices P.C.; James J. Zhu

(57) ABSTRACT

The present disclosure relates to a method and a server for controlling smart devices based on a predefined scenario mode. The method include: acquiring a status parameter collected by at least one first smart device bound to a user account; determining, according to the status parameter, whether to trigger a predefined scenario mode, the predefined scenario mode representing an operation mode for controlling actions of at least one second smart device bound to the user account according to the status parameter collected by the at least one first smart device; and sending a control instruction to the at least one second smart device, if it is determined to trigger the predefined scenario mode.

20 Claims, 9 Drawing Sheets

(51) Int. Cl.
   *H04L 12/28* (2006.01)
   *G05B 19/042* (2006.01)
(52) U.S. Cl.
   CPC ...... *H04L 12/2818* (2013.01); *H04L 12/2829* (2013.01); *G05B 2219/23027* (2013.01); *G05B 2219/23238* (2013.01)
(58) Field of Classification Search
   USPC ........................................................ 700/275
   See application file for complete search history.

(56) References Cited

U.S. PATENT DOCUMENTS

| | | | | |
|---|---|---|---|---|
| 2014/0108623 | A1* | 4/2014 | Gunderson | G06F 8/61 709/220 |
| 2015/0163096 | A1* | 6/2015 | Lee | G06Q 50/10 709/221 |

FOREIGN PATENT DOCUMENTS

| | | |
|---|---|---|
| CN | 101834591 A | 9/2010 |
| CN | 201788410 A | 4/2011 |
| CN | 102117063 A | 7/2011 |
| CN | 202075619 U | 12/2011 |
| CN | 102354194 A | 2/2012 |
| CN | 102447598 A | 5/2012 |
| CN | 102495617 A | 6/2012 |
| CN | 202274577 A | 6/2012 |
| CN | 102736526 A | 10/2012 |
| CN | 102736599 A | 10/2012 |
| CN | 102799163 A | 11/2012 |
| CN | 102843436 A | 12/2012 |
| CN | 103092172 A | 5/2013 |
| CN | 103162374 A | 6/2013 |
| CN | 203117773 U | 8/2013 |
| CN | 103347072 A | 10/2013 |
| CN | 203275958 U | 11/2013 |
| CN | 103616876 A | 3/2014 |
| CN | 103632415 A | 3/2014 |
| CN | 103869761 A | 6/2014 |
| CN | 103926890 A | 7/2014 |
| CN | 103927651 A | 7/2014 |
| CN | 103970103 A | 8/2014 |
| EP | 2506232 A1 | 3/2012 |
| JP | 2009238410 A | 10/2009 |
| JP | 2012209879 A | 10/2012 |
| RU | 130098 U1 | 7/2013 |
| WO | 2014047501 A1 | 3/2014 |
| WO | 2014172393 A1 | 10/2014 |

OTHER PUBLICATIONS

International Search Report for International application No. PCT/CN2015/074587, dated Jul. 28, 2015.
Russia Office action and Corresponding English Translation for Russia application No. 2015125294/11(039359), dated Jul. 22, 2016.
Zhiliang Wang, Hongchuan Yao et al, "Integrated Practical Training Course of Internet of Things Technology", published on Apr. 30, 2014 by China Machine Press, pp. 204-206.

* cited by examiner

US 10,057,077 B2

METHOD AND SERVER FOR CONTROLLING SMART DEVICES BASED ON PREDEFINED SCENARIO MODE

CROSS REFERENCE TO RELATED APPLICATIONS

This application is a Continuation of International Application No. PCT/CN2015/074587 with an international filing date of Mar. 19, 2015, which is based upon and claims priority to Chinese Patent Application No. 201410594507.4, filed on Oct. 29, 2014, the entire contents of which are incorporated herein by reference.

TECHNICAL FIELD

The present disclosure relates to a field of smart home suite technologies, and more particularly, to a method and a server for controlling smart devices based on a predefined scenario mode.

BACKGROUND

Home appliances have become an essential in people's daily life. Conventional home appliances are generally remotely controlled by users through touch buttons or infra-red remote controllers. With the development of the home appliances, conventional operation modes are no longer able to meet requirements of the users for controlling the home electrical appliances.

Conforming to this trend, a concept of a smart home is proposed. The smart home uses a house as a platform, integrates facilities related to home life together by using a comprehensive wiring technology, a network communication technology, a security protection technology, an automatic control technology, an audiovisual technology, and establishes an efficient management system of the facilities related to home life and normal daily routines, thus improving safety, accessibility, comfort and artistry of the home and achieving an eco-friendly living environment. This concept has been widely considered to be an inevitable trend of the home appliances in the future.

SUMMARY

According to a first aspect of embodiments of the present disclosure, a method for controlling smart devices based on a predefined scenario mode is provided. The method include: acquiring a status parameter collected by at least one first smart device bound to a user account; determining, according to the status parameter, whether to trigger a predefined scenario mode, the predefined scenario mode representing an operation mode for controlling actions of at least one second smart device bound to the user account according to the status parameter collected by the at least one first smart device; and sending a control instruction to the at least one second smart device, if it is determined to trigger the predefined scenario mode.

According to a second aspect of embodiments of the present disclosure, a server for controlling smart devices based on a predefined scenario mode is provided. The server includes: a processor; and a memory configured to store instructions executable by the processor, wherein the processor is configured to perform: acquiring a status parameter collected by at least one first smart device bound to a user account; determining, according to the status parameter, whether to trigger a predefined scenario mode, the predefined scenario mode representing an operation mode for controlling actions of at least one second smart device bound to the user account according to the status parameter collected by the at least one first smart device; and sending a control instruction to the at least one second smart device, if it is determined to trigger the predefined scenario mode.

According to a third aspect of embodiments of the present disclosure, another server for controlling smart devices based on a predefined scenario mode is provided. The server includes: a processor; and a memory configured to store instructions executable by the processor, wherein the processor is configured to perform: acquiring triggering information for triggering a predefined scenario mode, the predefined scenario mode representing an operation mode for controlling actions of at least one second smart device bound according to a status parameter collected by at least one first smart device; and sending a control instruction to the at least one second smart device, if it is determined to trigger the predefined scenario mode, wherein both the at least one first smart device and the at least one second smart device are bound to a user account.

The technical solutions provided in the embodiments of the present disclosure may associate the independent smart devices together and extend the application scenarios of the smart devices via the association.

It shall be appreciated that the above general description and the detailed description hereinafter are only illustrative but not for limiting the present disclosure.

BRIEF DESCRIPTION OF THE DRAWINGS

To clearly describe embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

The above drawings are used for illustrating the embodiments of the present disclosure, and more details will be given hereinafter. These drawings and textual descriptions are not intended to limit the scope defined in the present disclosure in any way, but intended to describe the inventive concept of the present disclosure, through specific embodiments, for a person skilled in the art.

DETAILED DESCRIPTION

To make the objectives, technical solutions, and advantages of the present disclosure clearer, the present disclosure is further described in detail with reference to the accompany drawings. Apparently, embodiments described herein are merely some exemplary ones, rather than all the embodiments of the present disclosure. Based on the embodiments of the present disclosure, all other embodiments derived by persons of ordinary skill in the art without any creative efforts shall fall within the protection scope of the present disclosure.

Embodiments are associated with a smart suite network system comprising a controlling device, a plurality of smart devices and a server. Firstly, it should be noted that, in various embodiments of the present disclosure, the controlling device may be an electronic device selecting from a group of phones, tablet computers, e-book readers, MP3 players (Moving Picture Experts Group Audio Layer III), MP4 players (Moving Picture Experts Group Audio Layer IV), portable laptops, and desktop computers and etc.

The controlling device may be one of the plurality of smart devices. Alternatively, the controlling device can also be a separate device besides the plurality of smart devices. For example, the smart devices may comprise a smart sockets, smart cameras, smart TVs and smart air conditioners in a smart home suite system. In one embodiment, the controlling device may be the smart TV among the home appliances. In other embodiments, the controlling device may be not one of the home appliances but a mobile phone. The controlling device and the plurality of smart devices are connected to the server by an external communication network. Moreover, the controlling device and the plurality of smart devices can be registered under a same user account. The server stores the registration information, user account information, device information of the controlling device and the plurality of smart devices and other necessary information to manage the controlling device and the plurality of smart devices. Moreover, the server may further store some predefined operation modes to control actions of the plurality of smart devices.

Accordingly, the present disclosure provides a method of controlling at least one second smart device in a server by monitoring or obtaining status parameters of at least one first smart device in the smart suite network system.

Figure 1:
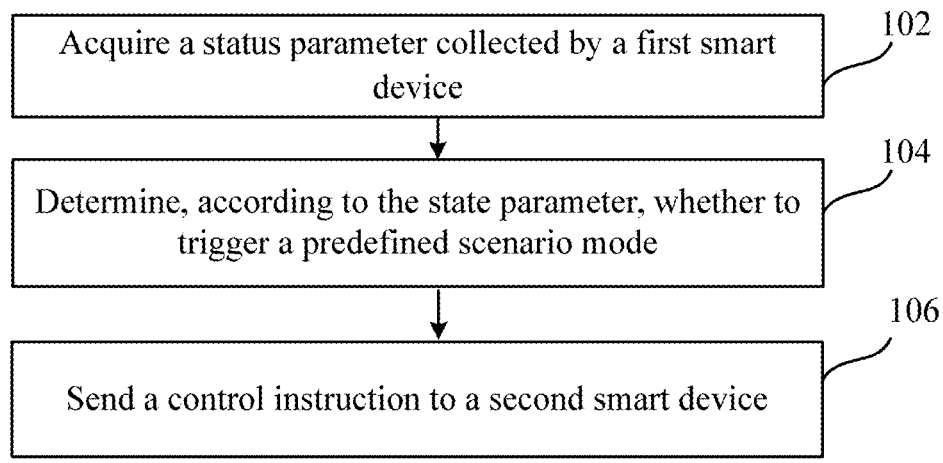
FIG. 1 is a flowchart illustrating a method for controlling smart devices based on a predefined scenario mode according to an exemplary embodiment of the present disclosure.

FIG. 1 is a flowchart illustrating a method for controlling smart devices based on a predefined scenario mode according to an exemplary embodiment of the present disclosure. This embodiment describes a method performed by the server. The method for controlling smart devices may include the following steps.

In step 102, a status parameter collected by at least one first smart device bound to a user account is acquired.

In step 104, it is determined, according to the status parameter, whether to trigger a predefined scenario mode. Herein the predefined scenario mode represents an operation mode for controlling actions of at least one second smart device bound to the user account according to the status parameter collected by the at least one first smart device.

In step 106, if it is determined to trigger the predefined scenario mode, a control instruction is sent to at least one second smart device. The at least one second smart device will be controlled to perform actions defined in the predefined scenario mode.

In conclusion, the method for controlling smart devices according to this embodiment associates different smart devices by using scenario modes prestored on a cloud server as media, such that the different smart devices achieve automatic linkage control based on an association defined for the scenario modes. With the method for controlling smart devices, originally independent smart devices may be associated, and the application scenarios of the smart devices may be extended via the association.

The smart device cited in this embodiment may be a smart home appliance or gadget. However, it should be noted that, the smart device cited in this embodiment does not be limited to a smart home appliance or gadget, it can include any device, component, furniture, tool, machine, car, or other things which can be electronically controlled and connected to a local or internet network.

In this embodiments, the scenario mode is configured to indicate an operation mode for controlling actions of the at least one second smart device according to a status parameter collected by the at least one first smart device. By establishing the scenario mode bound to the user account in the server, an automatic control of the at least one second smart device may be realized.

Moreover, the server establishes the scenario mode by using a scenario mode configuration. In some embodiments, the scenario mode configuration at least comprises parameters selected from: user account information, the device information of the smart devices, a startup condition parameter for defining conditions of triggering the scenario mode, and a task parameter for defining actions to be performed in the scenario mode.

User account information represents information of the use account. In the present disclosure, the controlling device and the smart devices are registered under a same user account. The user account is identified by the server by using the user account information such as a user name (login name, screen name or nickname), a phone number of the user, or an email address of the user and etc.

As for the device information of the smart devices, in the present disclosure, it includes: device information of the at least one first smart device bound to the user account and device information of the at least one second smart device bound to the user account. The device information includes device ID information and device type information. The device ID information may be a MAC (Media Access Control) address, an IP address, a device serial number and the like. The device type information indicates different types of the devices, such as smart sockets, smart cameras, smart TVs, smart air conditioners, and etc. As for different types of devices, different status parameters are collected and different control instructions are sent by the server.

The startup condition is the status parameter collected by the at least one first smart device and set as a condition for triggering the scenario mode. The status parameter collected by the devices may be different since the device types are different. For example, the smart socket may collect a current ON/OFF state of the smart socket, the smart camera may collect whether there is a moving object within the monitoring range, the smart air conditioner may collect a current indoor temperature and a current ON/OFF state of the smart air conditioner, etc. All these status parameters may be used as the status parameter collected by the first smart device.

The task is a corresponding control instruction configured to be sent to the at least one second smart device if the scenario mode is triggered. The corresponding control instructions may be different since the device types are different. For example, the smart socket may control the ON/OFF status of the smart socket, the smart air conditioner may control the ON/OFF status of the smart air conditioner and the set temperature, etc.

In this embodiment, at least two first smart devices are configured in the scenario mode. Status parameter corresponding to each of first smart devices serves as one of factors, in the startup condition, for determining whether to trigger the scenario mode. Herein, two methods for determining whether to trigger the scenario mode under circumstances where the first smart devices are present are given.

Way 1:

The scenario mode further includes: a startup condition logical conjunction. The startup condition logical conjunction is configured to indicate a logical conjunction of status parameters collected by each of the first smart devices. The logical conjunction herein may be logical "and" or logical "or", or a combination logical form constituted by logical "and" and "or".

According to this "Way 1", the predefined scenario mode is triggered only if the status parameters collected by the at least one first smart device satisfies the startup condition logical conjunction.

In this "Way 1", the status parameter collected by each first smart device is used as a factor for determining whether to trigger the scenario mode. It is determined whether to trigger a scenario mode by establishing a logical expression between the factors and judging whether the result of the logical expression.

Way 2:

The scenario mode further includes: a condition-task correlation table. Hherein the condition-task correlation table stores a mapping relationship between at least one group of startup conditions parameters and task parameters.

According to this "Way 2", the predefined scenario mode is triggered only if the status parameter collected by the at least one first smart device satisfies at least one group of startup parameters in the condition-task correlation table. Moreover, the task corresponding to the startup conditions parameters according to the condition-task correlation table will be triggered if at least one group of startup conditions in the condition-task correlation table are satisfied.

In this "Way 2", a condition-task correlation table is established in the scenario mode to determine a mapping relationship between startup conditions and tasks. Different startup conditions and different tasks are managed via the correlation table.

Moreover, in another embodiment, the method of customizing a scenario mode for smart devices may further includes a step of obtaining user account information of the user account. Accordingly, the above step of determining whether to trigger the predefined scenario mode comprises: searching for a predefined scenario mode according to the user account information and the device information of the at least one first smart device; and determining, according to the status parameter, whether to trigger the searched predefined scenario mode.

Moreover, if it is determined to trigger the scenario mode, the control instruction is sent to the at least one second smart device according to device information of the at least one second smart device stored in the scenario mode.

In this embodiment, the scenario modes stored on the server are managed based on the user account information. A plurality of predefined scenario modes may be managed under the same user account. The device information of the first smart device and the second smart device corresponding to different scenario modes may vary. When uploading the status parameter, the first smart device also uploads the bound user account information and the device information of the first smart device. The server firstly searches out, according to the user account information, the scenario modes stored by the user, and then searches out the scenario mode corresponding to the device information of the first smart device according to the device information of the first smart device. If it is determined to trigger the scenario mode, a control instruction is sent to the second smart device according to the device information of the second smart device stored in the scenario mode.

Furthermore, the present disclosure provides another embodiment. In this embodiment, the method for controlling smart devices based on a predefined scenario mode further includes a step of acquiring data content collected by the at least one first smart device if it is determined to trigger the predefined scenario mode. Then the acquired data content will be sent to the at least one second smart device after the predefined scenario mode is triggered.

In this embodiment, in addition to uploading the collected status parameter, the first smart device also uploads the collected data content, and meanwhile sends the collected data content to the second smart device when the server sends a control instruction to the second smart device. For example, the smart camera detects that a moving object is present at home and it is suspected that a thief has entered. In addition to uploading alarm information, the smart camera also uploads related videos. When the second smart device receives the control instruction, the second smart device also receives the videos for further analysis and judgment.

Figure 2:
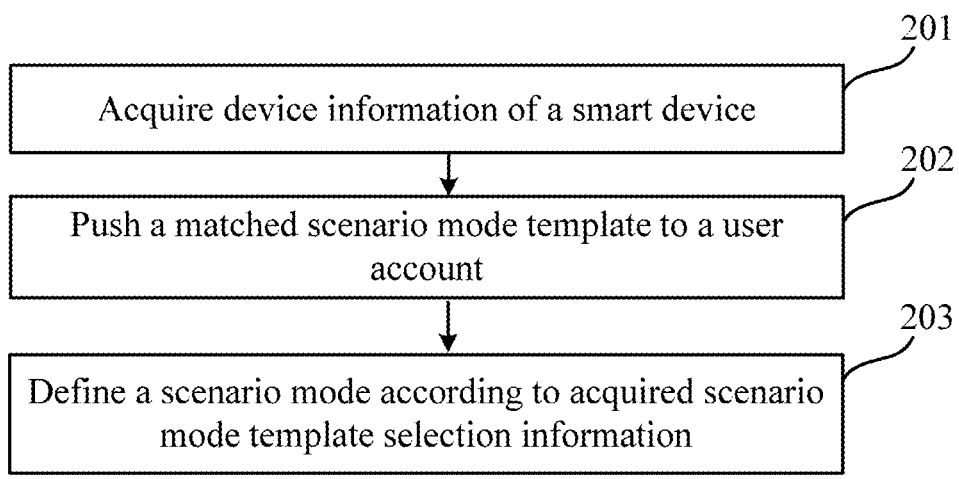
FIG. 2 is a flowchart illustrating a method for predefining scenario mode according to an exemplary embodiment of the present disclosure.

The scenario modes are predefined in the server. The present disclosure also provides a method for predefining scenario mode. FIG. 2 is a flowchart illustrating a method for predefining scenario mode according to an exemplary embodiment of the present disclosure. The method for predefining scenario mode may include the following steps.

In step 201, device information of a plurality of smart device bound to a user account is acquired.

In step 202, according to the device information of the plurality of smart devices, at least one predefined scenario mode template is pushed to the user account.

Herein the smart devices comprise at least one first smart device and at least one second smart device, and the scenario mode represents an operation mode for controlling actions of the at least one second smart device according to a status parameter collected by the at least one first smart device.

In step 203, scenario mode template selection information indicating a selected scenario mode template is received from the controlling device. Moreover, a scenario mode corresponding to the selected scenario mode template for the smart devices is defined according to the scenario mode template selection information.

In conclusion, this embodiment provides a method for configuring a scenario mode for smart devices. Different smart devices may be associated by using scenario modes as media, such that the different smart devices achieve automatic linkage control based on an associated relationship defined for the scenario modes. According to the method for configuring a scenario mode, several scenario mode templates are predefined on a server, and each scenario mode template corresponds to a scenario mode. The server determines, according to acquired device information of a smart device bound to a user account, at least one scenario mode template suitable for the user account, and pushes the matched scenario mode template to the user account. The scenario mode is finally defined according to selection via the user account. According to the method for configuring a scenario mode, a user may conveniently and quickly configure a scenario mode, thereby reducing inconvenience in defining a specific scenario mode.

Accordingly, in the scenario mode template, the majority of content of the corresponding scenario mode has been predefined, and only the user account information and the device ID information of the device information of the bound smart device are not provided. During recommending a corresponding scenario mode to a user account, the method for configuring a scenario mode automatically supplements the above not-provided content for the user, that is, defining the scenario mode bound to the user account is completed.

In this embodiment, the device information includes the device ID information and the device type information. Since different types of smart devices may provide different status parameter as the startup conditions, they are corresponding to different control instructions. According to the device information obtained, the server may obtain at least one of predefined scenario mode template corresponding to the acquired device type.

Moreover, in another embodiment, the method of configuring a scenario mode for smart devices may further includes a step of obtaining user account information of the user account. Accordingly, the scenario mode is established based on the obtained user account information, the device information of the at least one first smart device and the at least one second smart device.

In this embodiment, the scenario mode template is defined according to the type of the smart device. Different types of smart devices may provide different status parameter as the startup conditions, and correspond to different control instructions. Therefore, a certain scenario mode template is only applicable with respect to a specific type of smart device; otherwise, the scenario mode template may not be used. Just based on this, this embodiment provides a scenario mode template recommending method. Firstly, the device information of the smart device bound to the user account is acquired, and thus the user's currently available device type is acquired. Then, the scenario mode templates are screened in a scenario mode template library according to the device type information. Only when the first smart device and the second smart device in the scenario mode template are simultaneously bound to the user, the scenario mode template is pushed to the controlling device bound to the user account. When the user makes a selection, since the device ID information is acquired according to the device information of the smart device, the server may define the scenario mode bound to the user account according to the scenario mode template selected by the user. The user account information of the scenario mode is the user account information uploaded in step 102, the device information of the first smart device and the second smart device is device information of the corresponding types of smart devices in the scenario mode template, and the startup conditions and the tasks are predefined in the scenario mode template.

Figure 3A:
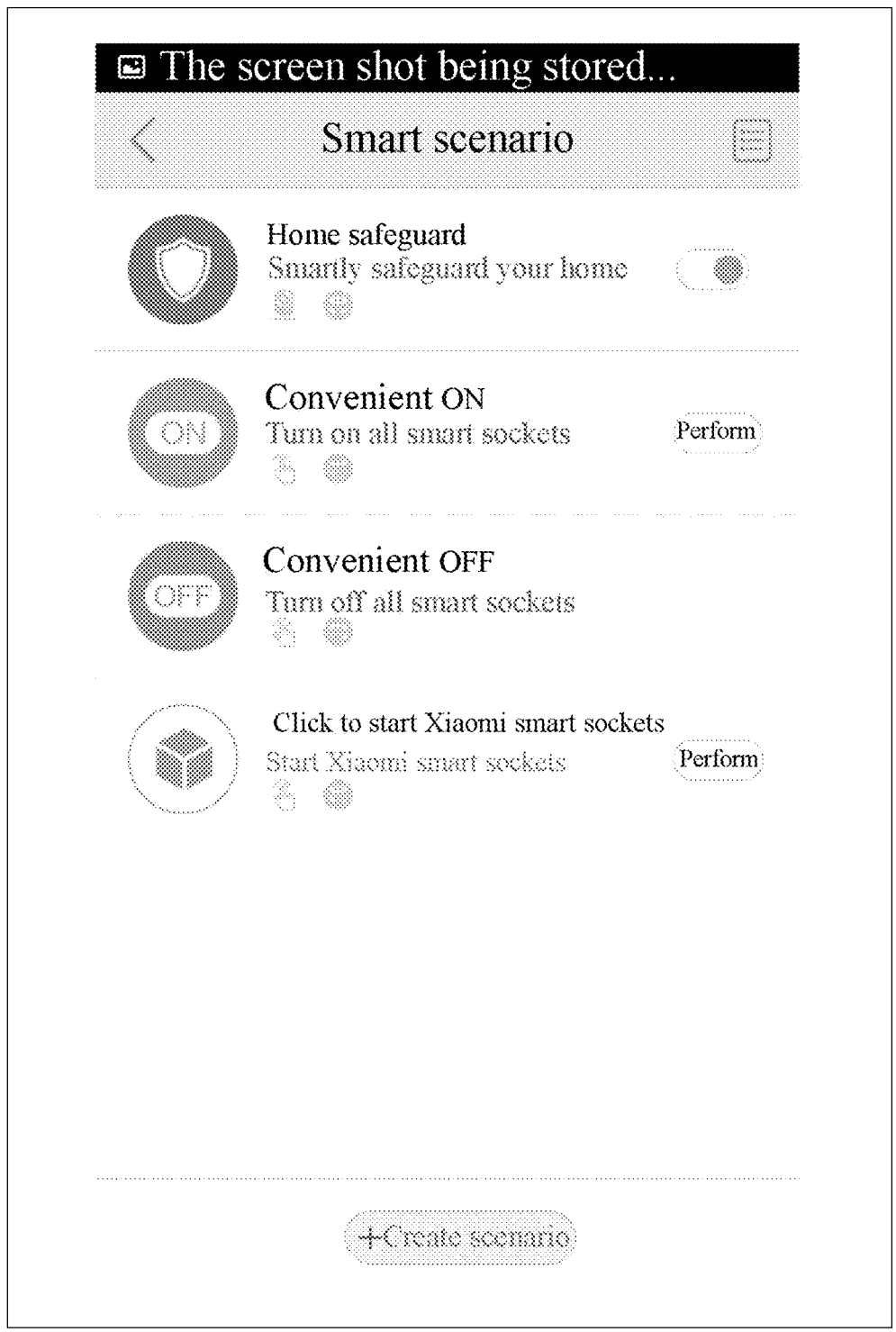
FIG. 3A is a schematic diagram illustrating an interface of a recommended scenario mode according to an exemplary embodiment of the present disclosure.
Figure 3B:
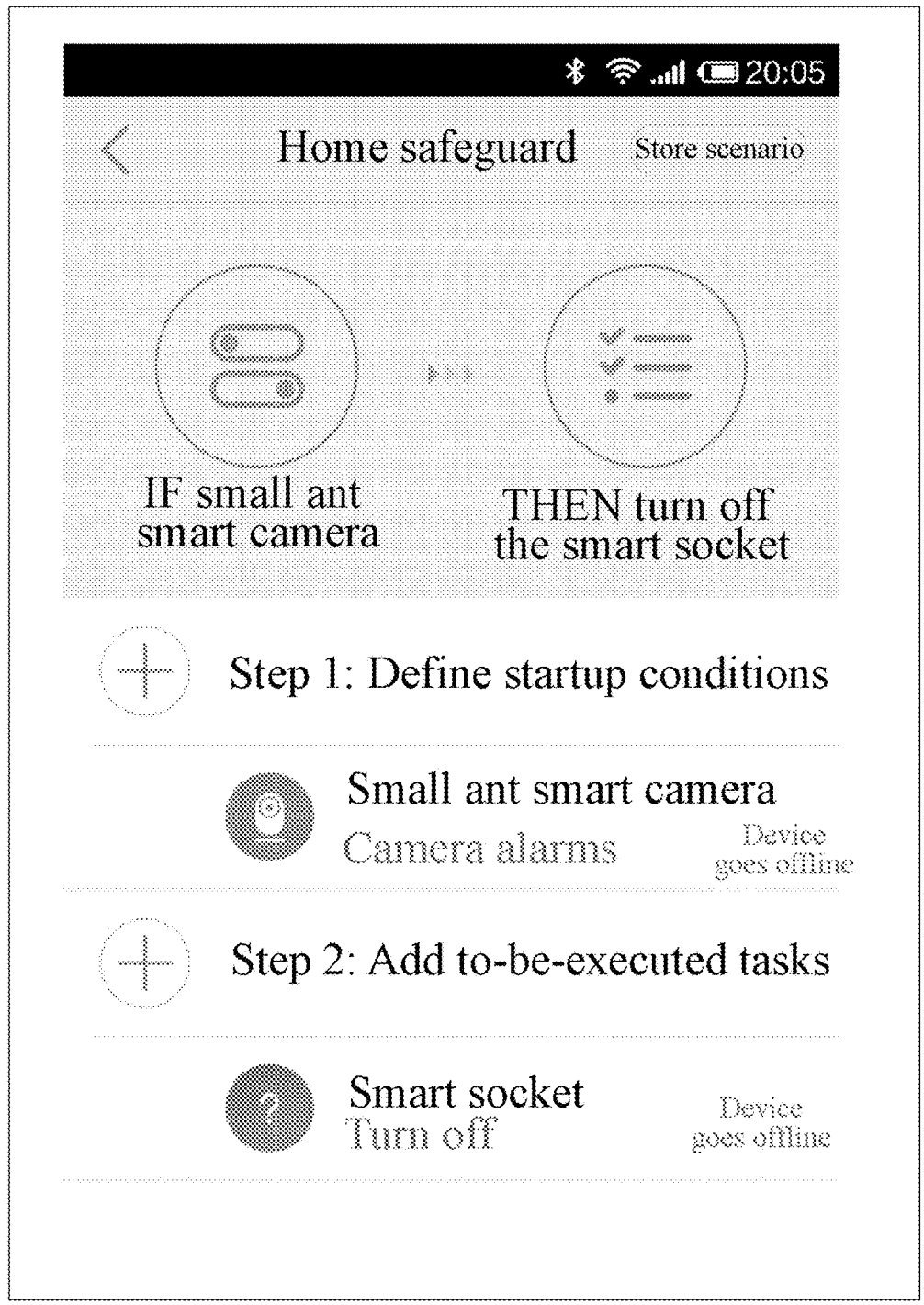
FIG. 3B is another schematic diagram illustrating an interface of a recommended scenario mode according to an exemplary embodiment of the present disclosure.

FIGS. 3A and 3B are schematic diagrams illustrating an interface of the controlling device for user to configure a scenario mode according to an exemplary embodiment of the present disclosure. As illustrated in FIGS. 3A and 3B, in this embodiment, an example of configuring a "home safeguard" scenario mode is given. The "home safeguard" scenario mode is a scenario mode template defined by a server. In the scenario mode template, it is defined that a first smart device type is "small ant smart camera", a second smart device type is "smart socket", a startup condition is "camera alarming", and a task (also called to-be-executed task) is "turning off the smart socket". After a user account is bound to a smart device, the server acquires device type information of the smart device bound to the user account, and determines whether the user account is bound to the "small ant smart camera" and the "smart socket". When the user account is simultaneously bound to these two types of smart devices, the server pushes the matched "home safeguard" scenario mode template to a user according to a search result. As illustrated in FIG. 3A, the user does not need to specifically configure the scenario mode, but needs to select to enable or disable the scenario mode. If the user selects to enable the "home safeguard" scenario mode, the "home safeguard" scenario mode may be automatically defined by configuration according to device information of the corresponding smart device bound to the user account, thereby implementing a linkage control relation between the "small ant smart camera" and the "smart socket" bound to the user account.

Figure 4:
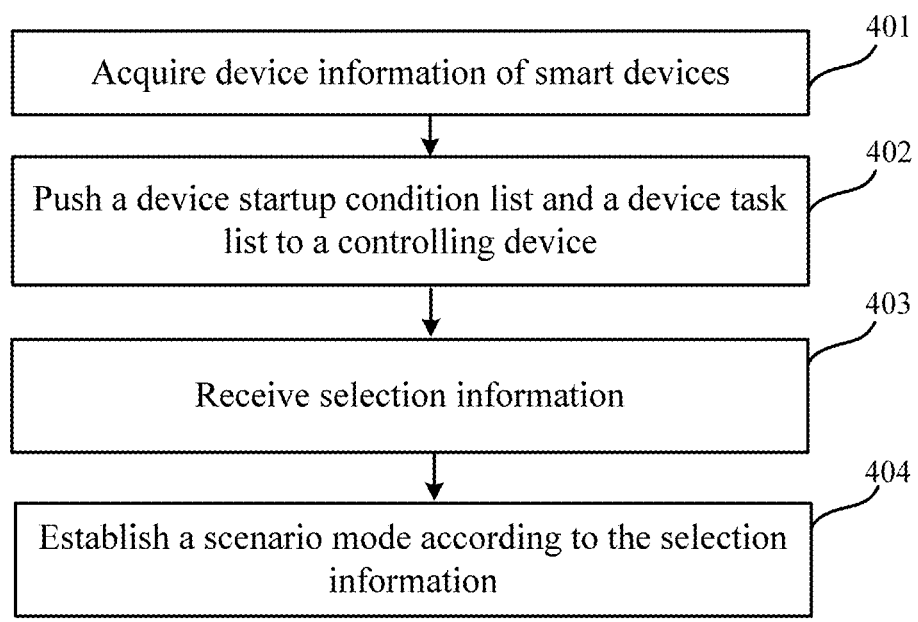
FIG. 4 is another flowchart illustrating a method for predefining scenario mode according to an exemplary embodiment of the present disclosure.

FIG. 4 is a flow chart showing a method of customizing a scenario mode for smart devices according to an exemplary embodiment. In this embodiment, take the method being implemented by the server as an example to illustrate. The method includes the following steps.

In step 401, device information of a plurality of smart device bound to a user account is obtained.

In step 402, a device startup condition list and a device task list are pushed respectively to a controlling device bound to the user account according to the device information of the smart devices.

In step 403, selection information indicating a selected startup condition and a selected device task is received from the controlling device.

In step 404, a scenario mode is established according to the selection information.

Herein, the smart devices comprise at least one first smart device and at least one second smart device, and the scenario mode represents an operation mode for controlling actions of the at least one second smart device according to a status parameter collected by the at least one first smart device.

This embodiment provides the user with a method of customizing a scenario mode for smart devices. In this method, the device information of the plurality of smart device bound to the user account is obtained by the server. And then the device startup condition list and the device task list matching the device information of the plurality of smart device are generated and pushed respectively to the controlling device bound to the user account according to the device information of the smart devices. The user only needs to operate on the controlling device to perform a selection from the device startup condition list and the device task list. After a user-preferred device startup condition and device task is selected and a linkage between the selected startup condition and the selected task is configured, the user may send his selection and configuration result to the server. Then the server may establish a relevant scenario mode for controlling the smart devices.

In this embodiment, the device information includes the device ID information and the device type information. Since different types of smart devices may provide different status parameter as the startup conditions, they are corresponding to different control instructions. According to the device information obtained, the server may obtain the startup condition options provided and available to the smart device bound to the user account and used as the startup conditions, and may obtain the task options provided and available to the smart device bound to the user account and used as the tasks, and thus generates the device startup condition list and the device task list. Therefore, the above step of pushing the device startup condition list and the device task list according to the device information of the at least one smart device includes the following steps.

At first, the device startup condition list matching the at least one smart device is generated according to the device type information of the at least one smart device, wherein the device startup condition list comprises a set of startup condition options available to the at least one smart device.

Moreover, the device task list is generated according to the device type information of the at least one smart device, wherein the device task list is a set of task options available to the at least one smart device.

Then, the device startup condition list and the device task list are sent to the controlling device respectively.

Moreover, in another embodiment, the method of customizing a scenario mode for smart devices may further includes a step of obtaining user account information of the user account. Accordingly, the scenario mode is established based on the obtained user account information, the device information of the at least one first smart device and the at least one second smart device, the selected device startup condition, and the selected device task.

In this embodiment, specific configuration of the user account information, the device information of the bound smart device, the startup condition and the task needed to establish the scenario mode are illustrated specifically.

In summary, in this embodiment, the device information bound to the user account obtained by the server may include the device type information. Since different types of smart devices may provide different status parameter as the startup conditions, they are corresponding to different control instructions. Based on this, a database may be established in advance in the server, wherein the database includes startup condition options available to various types of smart devices and used as the startup conditions and task options available to the various types of smart devices and used as the tasks. According to the device type information of the smart device bound to the user account obtained by the server, the server searches for the startup condition options and the task options respectively corresponding to the various smart devices based on the database. And then the server collects the startup condition options and the task options available to the various smart devices bound to the user account, thus obtaining the device startup condition list and the device task list. The user only needs to select in the device startup condition list and the device task list. After a user-preferred device startup condition and device task is selected and a linkage between the selected startup condition and the selected task is configured, the user may send his selection and configuration result to the server. Then the server may establish a relevant scenario mode for controlling the smart devices.

Figure 5A:
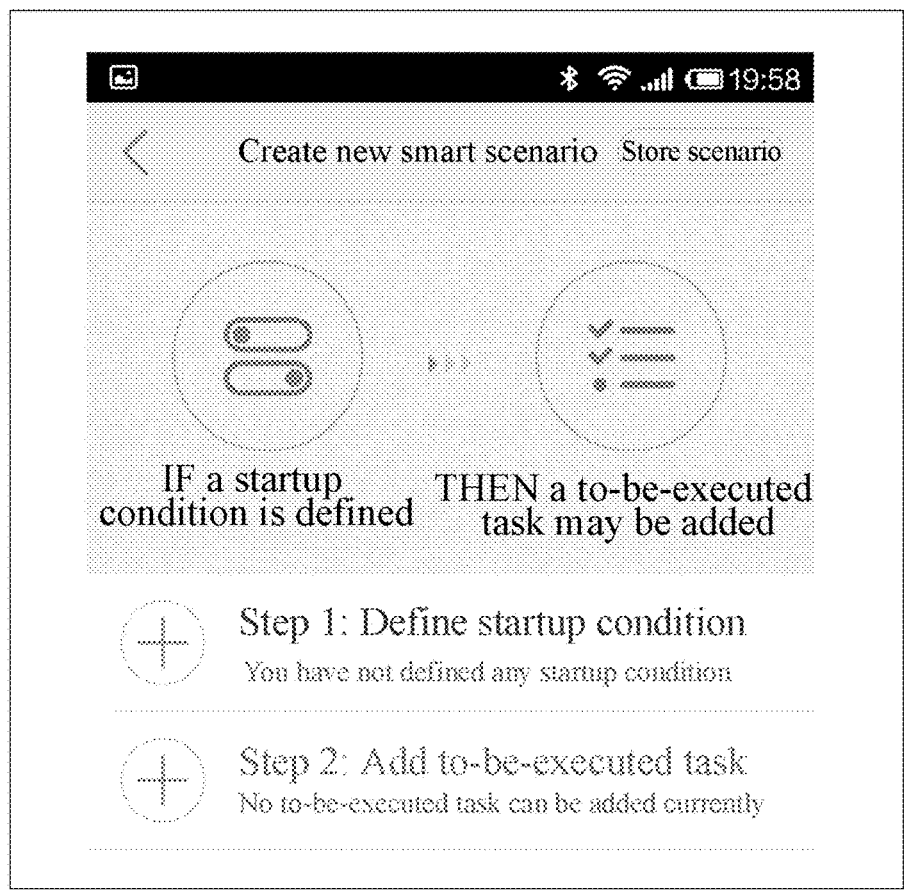
FIG. 5A is a schematic diagram illustrating an interface of a user-defined scenario mode according to an exemplary embodiment of the present disclosure.
Figure 5B:
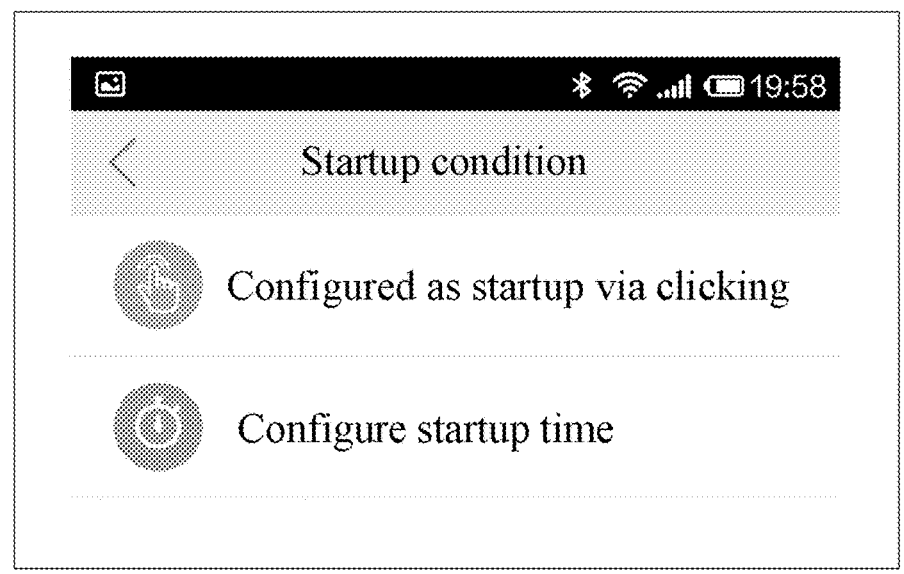
FIG. 5B is another schematic diagram illustrating an interface of a user-defined scenario mode according to an exemplary embodiment of the present disclosure.
Figure 5C:
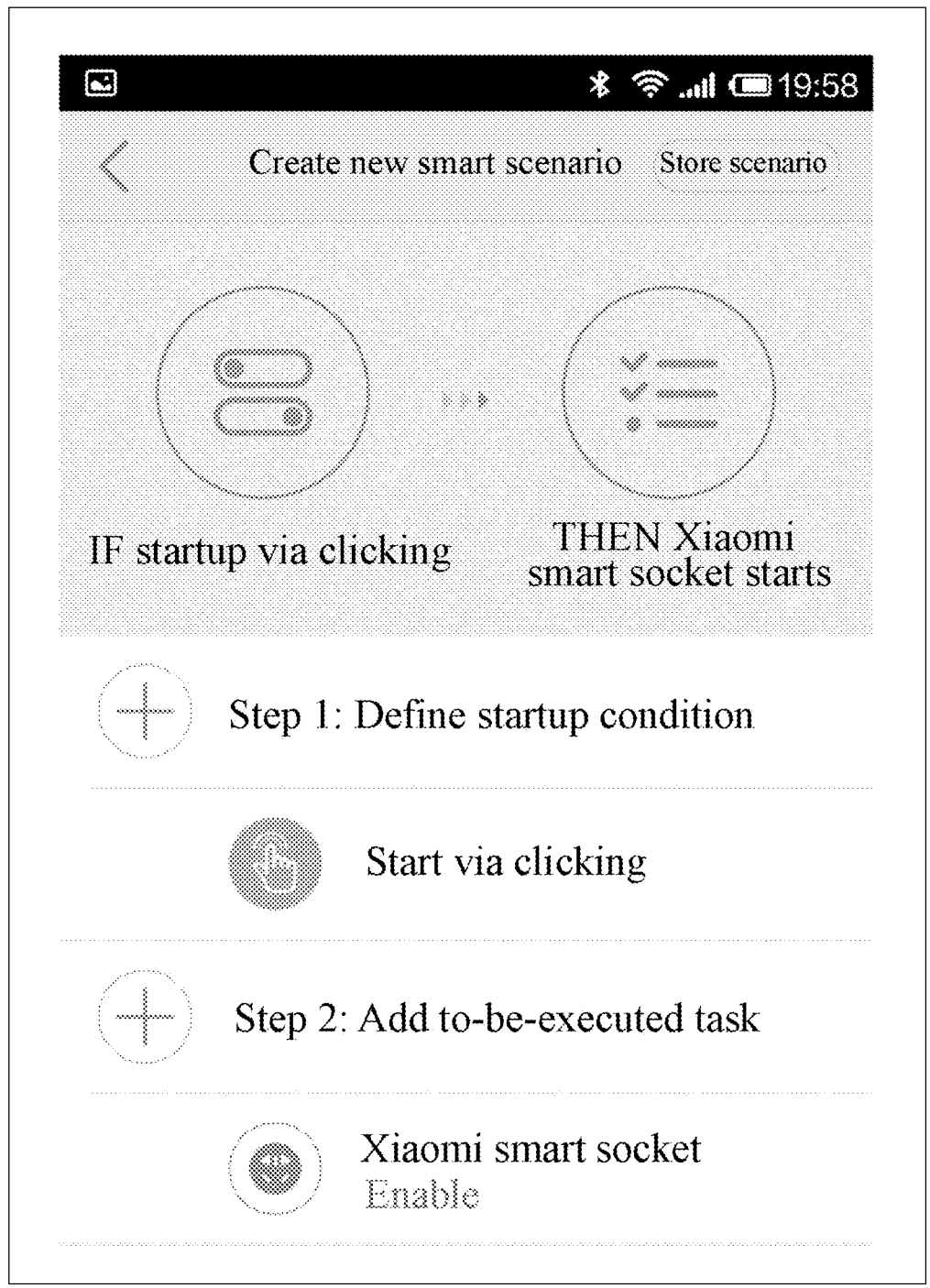
FIG. 5C is another schematic diagram illustrating an interface of a user-defined scenario mode according to an exemplary embodiment of the present disclosure.
Figure 5D:
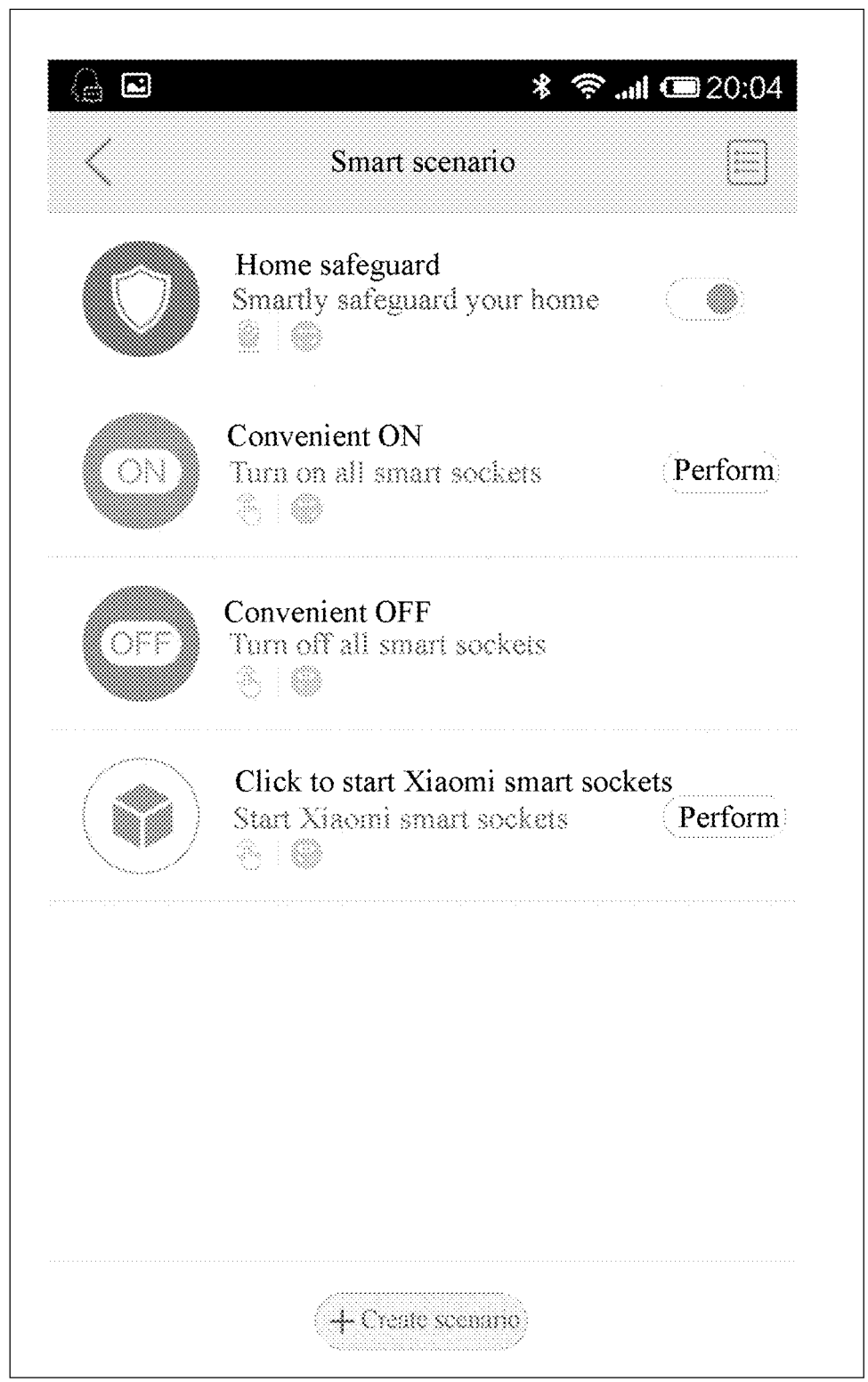
FIG. 5D is another schematic diagram illustrating an interface of a user-defined scenario mode according to an exemplary embodiment of the present disclosure.

FIGS. 5A, 5B, 5C, and 5D are schematic diagrams respectively illustrating an interface of the controlling device for user to configure a scenario mode according to an exemplary embodiment of the present disclosure. As illustrated in FIGS. 5A, 5B, 5C, and 5D, this embodiment gives an example of defining a scenario mode by a user himself or herself. As illustrated in FIG. 5A, this embodiment provides a free selection menu of a startup condition and a task of the scenario mode for the user. The user may obtain the device startup condition list and the device task list from the server. Herein, in the server, the two lists are generated based on the smart devices bound to the user account. Referring to FIG. 5B, the device startup condition list may include two startup condition options, i.e., "Configured as startup via clicking" and "Configure startup time". Referring to FIG. 5C, the user selects "Configured as startup via clicking" as the startup condition of the scenario mode and "XiaoMi smart socket—ON" as the task of the scenario mode by selecting in the list. Referring to FIG. 5D, if the user's selection is confirmed and saved, the scenario mode is established. Herein the scenario mode is based on the phone and MI smart socket bound to the user account as the first smart device and the second smart device, wherein the startup condition is "clicking" and the task is "Turning on the XiaoMi smart socket". The linkage between the two smart devices (the phone and XiaoMI smart socket) bound to the user may be established by setting the scenario mode.

Alternatively, in another embodiment, the method for controlling smart devices based on a predefined scenario mode includes the following steps.

At first, the server acquires triggering information for triggering a predefined scenario mode, the predefined scenario mode representing an operation mode for controlling actions of at least one second smart device bound according to a status parameter collected by at least one first smart device.

Then, the server sends a control instruction to the at least one second smart device, if it is determined to trigger the predefined scenario mode, wherein both the at least one first smart device and the at least one second smart device are bound to a user account.

In this embodiment, triggering and determination of the scenario mode are not performed in the server, but are performed in the first smart device or a router connected to the first smart device via a network. Upon acquiring a determination result, the first smart device or the router connected to the first smart device via a network generates trigger information of the scenario mode and sends the trigger information to a server side, and directly triggers the scenario mode to send a control instruction to at least one second smart device bound to the user account in the scenario mode.

Apparatus embodiments of the present disclosure are described hereinafter, wherein the apparatuses may be used to perform the method embodiments. Details that are not disclosed in the apparatus embodiments of the present disclosure, reference may be made to the method embodiments of the present disclosure.

Figure 6:
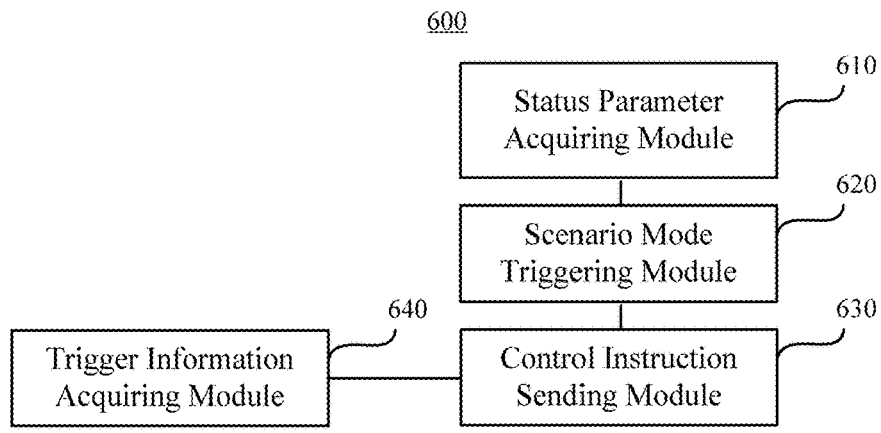
FIG. 6 is a schematic diagram illustrating an apparatus for controlling smart devices based on a predefined scenario mode according to an exemplary embodiment of the present disclosure.

FIG. 6 is a schematic diagram illustrating an apparatus for controlling smart devices based on a predefined scenario mode according to an exemplary embodiment of the present disclosure. The apparatus for controlling smart devices may be implemented via software, hardware or a combination of software and hardware as all or a part of an electronic device. The apparatus for controlling smart devices 600 based on a predefined scenario mode may include: a status parameter acquiring module 610, a scenario mode triggering module 620, and a control instruction sending module 630.

The status parameter acquiring module 610 is configured to acquire status parameter collected by at least one first smart device bound to a user account.

The scenario mode triggering module 620 is configured to determine, according to the status parameter, whether to trigger a predefined scenario mode, the scenario mode representing an operation mode for controlling actions of at least one second smart device bound to the user account according to the status parameter collected by the at least one first smart device.

The control instruction sending module 630 is configured to: if it is determined to trigger the scenario mode, send a control instruction to at least one second smart device.

In conclusion, the apparatus for controlling smart devices according to this embodiment associates different smart devices by using prestored scenario modes as media, such that the different smart devices achieve automatic linkage control based on an association defined for the scenario modes. With the apparatus for controlling smart devices, originally independent smart devices may be associated, and the application scenarios of the smart devices may be extended via the association.

Figure 7:
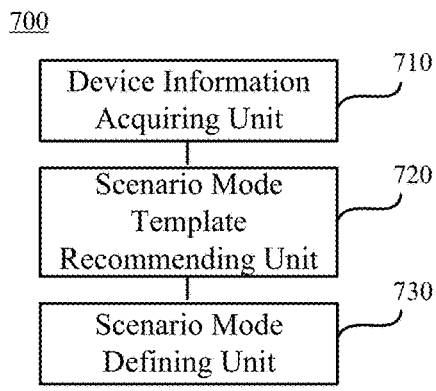
FIG. 7 is a schematic diagram illustrating a scenario mode predefining module according to an exemplary embodiment of the present disclosure.

In this embodiment, the control apparatus 600 further includes: a scenario mode predefining module 700. FIG. 7 is a schematic diagram of a scenario mode predefining module according to an exemplary embodiment of the present disclosure. The scenario mode predefining module 700 may include: a device information acquiring unit 710, a scenario mode template recommending unit 720, a scenario mode defining unit 730.

The device information acquiring unit 710 is configured to acquire device information of a plurality of smart devices bound to a user account.

The scenario mode template recommending unit 720 is configured to push, according to the device information of the smart devices, at least one predefined scenario mode template a controlling device bound to the user account.

The scenario mode defining unit 730 is configured to define a scenario mode corresponding to the selected scenario mode template for the smart devices, according to the scenario mode template selection information.

Herein the smart devices comprise at least one first smart device and at least one second smart device, and the scenario mode represents an operation mode for controlling actions of the at least one second smart device according to a status parameter collected by the at least one first smart device.

In the scenario mode predefining module 700, several scenario mode templates are predefined on a server, and each scenario mode template corresponds to a scenario mode. An association between a first smart device and a second smart device is predefined in the scenario mode template. The scenario mode predefining module 700 determines, according to acquired device information of a smart device bound to a user account, a scenario mode template suitable for the user account, and pushes the matched scenario mode template to the user account. The scenario mode is finally defined according to user's selection via the user account. With the scenario mode predefining module 700, a user may conveniently and quickly configure a scenario mode based on his or her bound smart device, rather than specifically defining an association, thereby reducing load of the user in defining a specific scenario mode.

Figure 8:
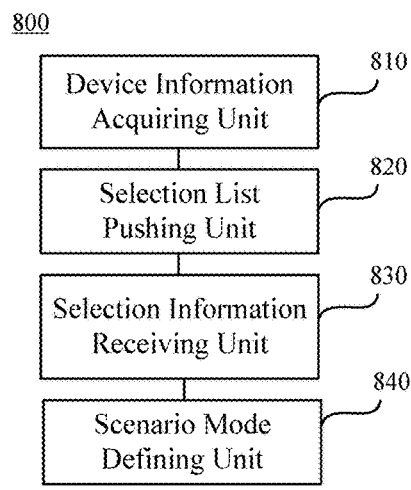
FIG. 8 is another schematic diagram illustrating a scenario mode predefining module according to an exemplary embodiment of the present disclosure.

In this embodiment, the control apparatus 600 further includes: a scenario mode predefining module 800. FIG. 8 is another schematic diagram illustrating a scenario mode predefining module according to an exemplary embodiment of the present disclosure. The scenario mode predefining module 800 may include: a device information acquiring unit 810, a selection list pushing unit 820, a selection information receiving unit 830, and a scenario mode defining unit 840.

The device information acquiring unit 810 is configured to acquire device information of a plurality of smart devices bound to a user account.

The selection list pushing unit 820 is configured to push, according to the device information of the smart devices, a device startup condition list and a device task list to a controlling device bound to the user account respectively.

The selection information receiving unit 830 is configured to receive from the controlling device, selection information indicating a selected startup condition and a selected device task.

The scenario mode defining unit 840 is configured to establish according to the selection information, a scenario mode for the smart devices. Herein the smart devices comprise at least one first smart device and at least one second smart device, and the scenario mode represents an operation mode for controlling actions of the at least one second smart device according to a status parameter collected by the at least one first smart device.

This embodiment provides a scenario mode predefining module 800 for a user to define by himself or herself a scenario mode. The scenario mode predefining module 800 acquires device information of at least one smart device bound to a user account. The device information includes device ID information and device type information. Different types of smart devices may provide different status parameter as the startup conditions, and correspond to different control instructions. Based on the acquired device information, the server may acquire the startup condition options which are supported by the smart device bound to the user account as the startup conditions and the task options which are supported by the smart device bound to the user account as the tasks. The startup condition options and the task options that are supported by various smart devices bound to the user account are gathered to obtain a device startup condition list and a device task list. By merely making selection in the device startup condition list and the device task list, the user may establish a linkage relation between a selected startup condition option and a selected task option, and further establish a related scenario mode.

Optionally, the control apparatus 600 further includes: a trigger information acquiring module 640, configured to acquire trigger information of the predefined scenario mode.

Herein the trigger information of the scenario mode is generated by determination of the at least one first smart device bound to the user account according to the collected status parameter.

Alternatively, the trigger information of the scenario mode is generated by determination of a router connected to the at least one first smart device over a network according to the status parameter collected by the at least one first smart device.

Then, the control instruction sending module 630 is further configured to send a control instruction to at least one second smart device bound to the user account in the scenario mode according to the trigger information of the scenario mode, to control the second smart device to perform a corresponding operation.

In this embodiment, triggering and determination of a scenario mode are not performed in the server, but are performed in the first smart device or a router connected to the first smart device via a network. Upon acquiring a determination result, the first smart device or the router connected to the first smart device via a network generates trigger information of the scenario mode and sends the trigger information to a server side, and directly triggers the scenario mode to send a control instruction to at least one second smart device bound to the user account in the scenario mode.

Figure 9:
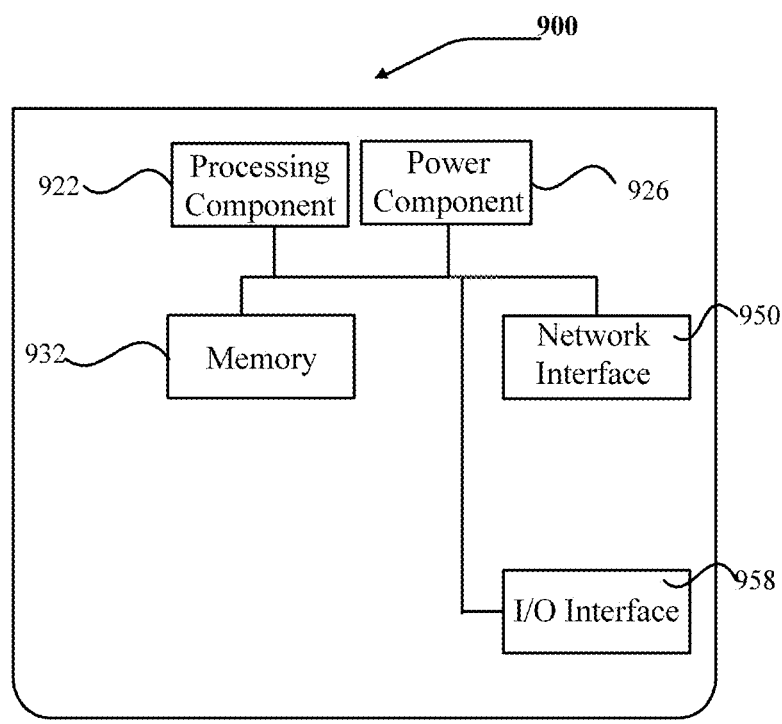
FIG. 9 is a block diagram illustrating a server for controlling smart devices based on a predefined scenario mode according to an exemplary embodiment of the present disclosure.

FIG. 9 is a block diagram illustrating a sever 900 for controlling smart devices based on a predefined scenario mode according to an exemplary embodiment of the present disclosure. For example, the sever 900 may be provided as a server. Referring to FIG. 9, the sever 900 includes a processing component 922, which further includes one or more processors, and memory resources represented by a memory 932, configured to store instructions executable by the processing component 922, for example, applications. The applications stored in the memory 932 may include one or more than one module each corresponding to a group of instructions. In addition, the processing component 922 is configured to execute the instructions, to perform the above methods.

The sever 900 may further include: a power component 926, configured to perform power management in the sever 900; a wired or wireless network interface 950, configured to connect the sever 900 to the network; and an input/output (I/O) interface 958. The sever 900 may operate an operating system stored in the memory 932, for example, Windows Server™, Mac OS X™, Unix™, Linux™, FreeBSD™, or the like.

A non-transitory computer-readable storage medium is provided. When instructions stored in the storage medium are executed by a processor of the sever 900, the sever 900 is caused to perform a method for controlling smart devices as illustrated in FIG. 1.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for controlling smart devices based on a predefined scenario mode, comprising:
acquiring, by a server, a status parameter collected by at least one first smart device bound to a user account;
determining, by the server, whether to trigger the predefined scenario mode associating at least one action to be performed by at least one second smart device bound to the user account with at least one startup condition for the at least one first smart device by comparing the status parameter collected by the at least one first smart device with the at least one startup condition; and
controlling, by the server, the at least one second smart device to perform the at least one action, if it is determined to trigger the predefined scenario mode;
wherein the status parameter is an operation parameter of the at least one first smart device or an environment parameter detected by the at least one first smart device.

2. The method according to claim 1, wherein the predefined scenario mode further comprises user account information of the user account and device information of the at least one first smart device.

3. The method according to claim 2, wherein the device information of the at least one first smart device comprises device type information of the at least one first smart device.

4. The method according to claim 2, further comprising:
acquiring, by the server, the user account information of the user account and the device information of the at least one first smart device.

5. The method according to claim 4, further comprising:
searching, by the server, for the predefined scenario mode according to the user account information and the device information of the at least one first smart device.

6. The method according to claim 5, wherein said searching, by the server, for the predefined scenario mode according to the user account information and the device information of the at least one first smart device comprises:
searching, by the server, for all predefined scenario modes corresponding to the user account according to the user account information;
searching, by the server, for the predefined scenario mode according to the device information of the at least one first smart device from all predefined scenario modes corresponding to the user account.

7. The method according to claim 2, wherein the predefined scenario mode further comprises device information of the at least one second smart devices.

8. The method according to claim 7, wherein if it is determined to trigger the scenario mode, a control instruction for performing the at least one action is sent to the at least one second smart device according to the device information of the at least one second smart device.

9. The method according to claim 1, wherein data content collected by the at least one first smart device is acquired and then sent to the at least one second smart device if it is determined to trigger the predefined scenario mode.

10. A server for controlling smart devices based on a predefined scenario mode, comprising:
a processor; and
a memory configured to store instructions executable by the processor,
wherein the processor is configured to perform:
acquiring a status parameter collected by at least one first smart device bound to a user account;
determining, whether to trigger the predefined scenario mode associating at least one action to be performed by at least one second smart device bound to the user account with at least one startup condition for the at least one first smart device by comparing the status parameter collected by the at least one first smart device with the at least one startup condition; and
controlling the at least one second smart device to perform the at least one action, if it is determined to trigger the predefined scenario mode;

wherein the status parameter is an operation parameter of the at least one first smart device or an environment parameter detected by the at least one first smart device.

11. The server according to claim 10, wherein the predefined scenario mode further comprises user account information of the user account and device information of the at least one first smart device.

12. The server according to claim 11, wherein the device information of the at least one first smart device comprises device type information of the at least one first smart device.

13. The server according to claim 11, wherein the processor is further configured to perform:
acquiring the user account information of the user account and the device information of the at least one first smart device.

14. The server according to claim 13, wherein the processor is further configured to perform:
searching for the predefined scenario mode according to the user account information and the device information of the at least one first smart device.

15. The server according to claim 14, wherein said searching for the predefined scenario mode according to the user account information and the device information of the at least one first smart device comprises:
searching for all predefined scenario modes corresponding to the user account according to the user account information;
searching for the predefined scenario mode according to the device information of the at least one first smart device from all predefined scenario modes corresponding to the user account.

16. The server according to claim 11, wherein the predefined scenario mode further comprises device information of the at least one second smart devices.

17. The server according to claim 16, wherein if it is determined to trigger the scenario mode, a control instruction for performing the at least one action is sent to the at least one second smart device according to the device information of the at least one second smart device.

18. The server according to claim 10, wherein data content collected by the at least one first smart device is acquired and then sent to the at least one second smart device if it is determined to trigger the predefined scenario mode.

19. A server for controlling smart devices based on a predefined scenario mode, comprising:
a processor; and
a memory configured to store instructions executable by the processor,
wherein the processor is configured to perform:
receiving triggering information for triggering a predefined scenario mode, the predefined scenario mode associates at least one action to be performed by at least one second smart device with at least one startup condition for at least one first smart device; and
controlling the at least one second smart device to perform the at least one action, if it is determined to trigger the predefined scenario mode,
wherein both the at least one first smart device and the at least one second smart device are bound to a user account;
wherein the triggering information is determined by comparing a status parameter collected by the at least one first smart device with the at least one startup condition; and
wherein the status parameter is an operation parameter of the first smart device or an environment parameter sensed by the first smart device.

20. The server according to claim 19, wherein the predefined scenario mode further comprises user account information of the user account and device information of the at least one first smart device.

* * * * *